US011299844B2

(12) United States Patent
Lee et al.

(10) Patent No.: US 11,299,844 B2
(45) Date of Patent: Apr. 12, 2022

(54) WASHING MACHINE

(71) Applicant: LG ELECTRONICS INC., Seoul (KR)

(72) Inventors: Jeonguk Lee, Seoul (KR); Joonho Pyo, Seoul (KR); Taehee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 16/578,097

(22) Filed: Sep. 20, 2019

(65) Prior Publication Data
US 2020/0131686 A1 Apr. 30, 2020

(30) Foreign Application Priority Data

Sep. 21, 2018 (KR) .......................... 10-2018-0113472

(51) Int. Cl.
| | |
|---|---|
| *D06F 37/40* | (2006.01) |
| *D06F 23/04* | (2006.01) |
| *F16C 35/063* | (2006.01) |
| *F16D 11/14* | (2006.01) |
| *F16D 27/09* | (2006.01) |
| *H01F 7/08* | (2006.01) |

(Continued)

(52) U.S. Cl.
CPC .............. *D06F 37/40* (2013.01); *D06F 23/04* (2013.01); *F16C 35/063* (2013.01); *F16D 11/14* (2013.01); *F16D 27/09* (2013.01); *H01F 7/081* (2013.01); *H01F 27/24* (2013.01); *H01F 27/325* (2013.01)

(58) Field of Classification Search
None
See application file for complete search history.

(56) References Cited

U.S. PATENT DOCUMENTS 5,040,285 A * 8/1991 Williams ................ D06F 37/40
29/596
5,586,455 A * 12/1996 Imai ........................ D06F 37/40
68/12.02

(Continued)

FOREIGN PATENT DOCUMENTS

| JP | 2001-137595 A | 5/2001 |
|---|---|---|
| KR | 2003-0023316 A | 3/2003 |

(Continued)

*Primary Examiner* — Cristi J Tate-Sims
(74) *Attorney, Agent, or Firm* — Birch, Stewart, Kolasch & Birch, LLP

(57) ABSTRACT

A washing machine includes a washing tub which accommodates laundry, a pulsator disposed in the washing tub, a drive which rotates the pulsator, a dehydration shaft connected to the washing tub, a solenoid, a clutch provided at a lower side of the solenoid to perform a shaft-joint connection between the drive shaft and the dehydration shaft at a connection position and to perform a shaft-joint release between the drive shaft and the dehydration shaft at a disconnection position lifted from the connection position by a magnetic force of the solenoid, a bearing disposed above the solenoid and supporting the dehydration shaft, and a bearing housing which receives the bearing and the solenoid. The bearing housing includes a first fixing core surrounding an outer circumference of the bearing, and a second fixing core extended downward from the first fixing core and surrounding an outer circumference of the solenoid.

20 Claims, 12 Drawing Sheets

(51) Int. Cl.
*H01F 27/24* (2006.01)
*H01F 27/32* (2006.01)

(56) References Cited

U.S. PATENT DOCUMENTS

| | | | | |
|---|---|---|---|---|
| 5,771,719 | A | * 6/1998 | Moon | D06F 17/12 68/183 |
| 2002/0166349 | A1 | * 11/2002 | Lim | D06F 37/40 68/23.7 |
| 2003/0000263 | A1 | * 1/2003 | Kim | D06F 37/40 68/23.7 |

FOREIGN PATENT DOCUMENTS

| | | |
|---|---|---|
| KR | 10-2003-0037784 A | 5/2003 |
| KR | 10-0393802 B1 | 8/2003 |
| KR | 10-0766026 B1 | 10/2007 |

\* cited by examiner (a)

(b)

(a)

(b)

WASHING MACHINE

CROSS REFERENCE TO RELATED APPLICATION

This non-provisional application claims the benefit under 35 U.S.C. § 119(a) to Patent Application No. 10-2018-0113472, filed in the Republic of Korea on Sep. 21, 2018, all of which is hereby expressly incorporated by reference into the present application.

BACKGROUND OF THE INVENTION

1. Field of the Invention

The present disclosure relates to a washing machine having a clutch operated by a solenoid.

2. Description of the Related Art

A washing machine that is provided with a clutch that is operated by a solenoid, and that selectively connects or disconnects a laundry shaft to a dehydration shaft, is well known. For example, Korean Patent Laid-Open Publication No. 2003-0023316 (hereinafter, referred to as "related art"), as shown in FIGS. 1 to 5, discloses a structure in which a slider 94 serration-coupled with a dehydration shaft 93 is separated from a driving container 92 formed in a rotor 91 of a washing motor while being lifted by the magnetic force of a solenoid 95.

In the state where power is not applied to the solenoid 95, the slider 94 is engaged with both the dehydration shaft 93 and the driving container 92, so that the rotational force of the rotor 91 is transmitted to the dehydration shaft 93 through the slider 94. At this time, the washing shaft 96 and the dehydration shaft 93 are rotated together.

On the contrary, when power is applied to the solenoid 95, the slider 94 is lifted up by the magnetic force of the solenoid 95 and separated from the driving container 92. Therefore, since the rotational force of the rotor 91 is no longer transmitted to the dehydration shaft 93, only the washing shaft 96 connected to the rotor 91 is rotated.

The solenoid 95 is disposed in a space surrounded by first and second yoke plates 97 and 98. At this time, in the second yoke plate 98, a flat portion 982 bent at the lower end of a cylindrical portion 981 surrounds the bottom surface of the solenoid 95.

In the slider 94, a movable yoke 94a of metallic material receives force upward due to the magnetic force of the solenoid 95. At this time, a coupling body 94b serration-coupled with the dehydration shaft 96 in the movable yoke 94a is raised along the dehydration shaft 96 together with the movable yoke 94a.

The movable yoke 94a is configured to include a cylindrical portion 941 disposed in an inner area of the solenoid 95, and a flange 943 that is extended from the lower end of the cylindrical portion 941, and has an unevenness portion 942 engaged with an unevenness formed in the driving container 92.

A problem of such a related art is magnetic leakage from the movable yoke 94a to the washing shaft 96. FIG. 5 shows the magnetic field generated by the solenoid 95. When the first yoke plate 97 and the second yoke plate 98 are formed of ferromagnetic material, the first yoke plate 97, the second yoke plate 98, and the movable yoke 94a form a magnetic path in a substantially closed form to concentrate the magnetic flux, and magnetic flux flowing along the magnetic path contributes to lift the movable yoke 94a. In FIG. 5, the magnetic path is indicated by a two-point chain line.

However, since the magnetic flux P leaked to the dehydration shaft 96 from the cylindrical portion 941 of the movable yoke 94a substantially contributes little to lift the movable yoke 94a, such a magnetic loss becomes a factor that reduces the efficiency of the solenoid 95.

In addition to this, since the related art uses the first yoke plate 97 and the second yoke plate 98 to form the magnetic path, there is a problem in that the number of parts increases, thereby increasing the manufacturing cost.

SUMMARY OF THE INVENTION

The present disclosure has been made in view of the above problems, and provides a washing machine that has a clutch operated by a solenoid, and in particular, a washing machine that forms a fixing core magnetized by the solenoid in a bearing housing in which a bearing is accommodated for supporting a dehydration shaft.

The present disclosure further provides a washing machine which can efficiently use the magnetic flux that contributes to the lifting of the clutch, by improving the magnetic path where the magnetic flux generated from the solenoid moves.

The present disclosure further provides a washing machine in which a separate fixing core added to construct the magnetic path is eliminated, by allowing a bearing housing for accommodating a bearing supporting the dehydration shaft to constitute a part of the magnetic path through which the magnetic flux generated from the solenoid passes.

The present disclosure further provides a washing machine in which a separate part used to install the conventional solenoid is eliminated, by disposing the solenoid in the bearing housing.

The present disclosure further provides a washing machine that can utilize the magnetic flux flowing from an armature to the dehydration shaft to lift the armature.

The washing machine of the present disclosure operates by a solenoid, and includes a clutch that performs a shaft-joint (or connection) or a shaft-joint release (or disconnection/separation) between the drive shaft and the dehydration shaft.

The drive shaft is an axis for rotating the pulsator. The drive shaft may be directly connected to the pulsator or connected by a planetary gear train.

The dehydration shaft is connected to the washing tub, and has a first hollow through which the drive shaft passes. At least a part of the dehydration shaft is formed of ferromagnetic material.

An upper side of the solenoid is provided with a bearing for supporting the dehydration shaft. At least a part of the bearing is formed of ferromagnetic material. A bearing housing is provided to accommodate the bearing, and the solenoid is installed in the bearing housing.

The bearing housing includes a first fixing core surrounding the outer circumference of the bearing, and a second fixing core extending downward from the first fixing core and surrounding the outer circumference of the solenoid.

Specifically, the bearing housing may include a cylindrical portion (or a tubular portion) that is extended in the vertical direction while surrounding the bearing and the solenoid, and the cylindrical portion may form a magnetic path. At least a part of the bearing housing is formed of ferromagnetic material.

The clutch is provided to be lifted along the dehydration shaft from the lower side of the solenoid. The clutch performs a shaft-joint coupling between the drive shaft and the dehydration shaft in a connection position, and performs a shaft-joint release between the drive shaft and the dehydration shaft in a disconnection position raised from the connection position by a magnetic force of the solenoid.

Specifically, the clutch may include an armature that is lifted by the magnetic force of the solenoid, and a clutch coupler that is lifted (or moved together with the armature) by the armature.

The armature may include a core base disposed below the cylindrical portion and extending outwardly from the clutch coupler, and a core outer portion extending upward from an outer circumference of the core base.

The magnetic flux generated by the solenoid is moved along the cylindrical portion, the core outer portion, the core base, the dehydration shaft, and the bearing. That is, the cylindrical portion, the armature (core outer portion and core base), the dehydration shaft, and the bearing form a magnetic path.

The inner circumferential surface of the clutch coupler defines a second hollow through which the dehydration shaft passes, and may be spline-jointed to the outer circumferential surface of the dehydration shaft so that the clutch coupler is lifted along the dehydration shaft.

The clutch coupler may perform a shaft-joint connection between the drive shaft and the dehydration shaft in a first position corresponding to the connection position, and perform a shaft-joint release between the drive shaft and the dehydration shaft in a second position corresponding to the disconnection position.

An upper end of the core outer portion may be located farther from the dehydration shaft than the cylindrical portion. The core outer portion may be further away from the dehydration shaft as it progresses toward the upper end from the core base.

The core outer portion may have a cylindrical shape extended along the outer circumference of the core base.

In the state where the armature is lowered to the connection position, the upper end of the core outer portion may be spaced apart from the lower end of the cylindrical portion of the bearing housing. In the state where the armature is raised to the disconnection position, the upper end of the core outer portion may be located above the lower end of the cylindrical portion of the bearing housing.

The core base may include an opening through which the dehydration shaft passes, and the armature may further include a core inner portion extending upward from the circumference of the opening. The core inner portion may be formed in a cylindrical shape surrounding the dehydration shaft.

The inner core portion may extend from the core base to a position lower than the outer core portion. The core inner portion is separated further downward from the cylindrical portion of the bearing housing or the bearing than the core outer portion. The clutch coupler may be coupled to the core inner portion. The clutch coupler may be a synthetic resin material.

An elastic member may be further included for applying a repulsive force in the downward direction to the clutch. The solenoid may include a bobbin having a hollow through which the dehydration shaft passes, and a coil wound around the bobbin.

The elastic member may be a coil spring disposed in the hollow in an outer insertion state to the dehydration shaft. The coil spring may be disposed between the bearing and the clutch coupler.

The cylindrical portion of the bearing housing may include a first fixing core defining an area in which the bearing is installed, and a second fixing core extending downward from the first fixing core and having a reduced inner diameter than the first fixing core.

The bobbin may include a cylindrical bobbin body portion around which the coil is wound, and an upper plate portion extended outward from an upper end of the bobbin body portion. The upper plate may be supported by a horizontal portion formed due to the inner diameter difference between the first fixing core and the second fixing core.

A washing motor having a rotor connected to the drive shaft, and a rotor hub connecting the rotor to the drive shaft may be further included. The clutch coupler may be engaged with the rotor hub in the connection position and may be separated from the rotor hub in the disconnection position.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE DISCLOSED EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
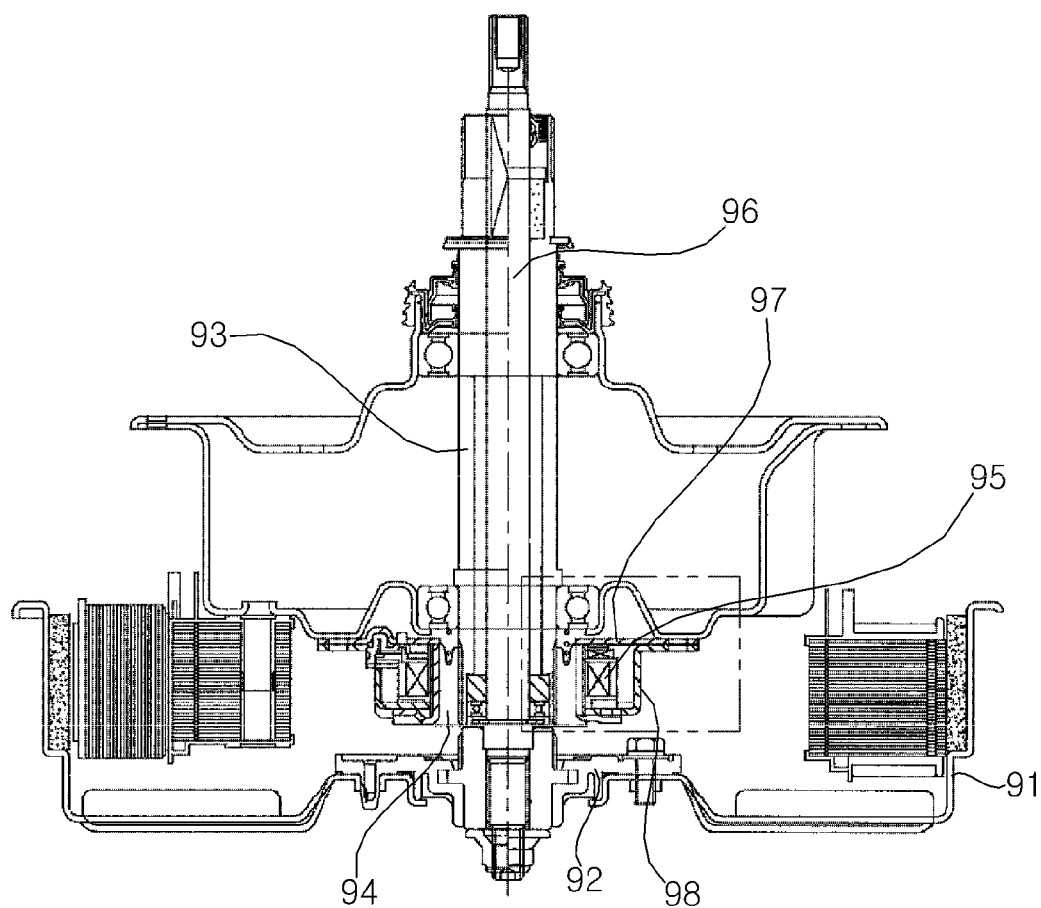
FIG. 1 shows a clutching system of a washing machine according to a related art.
Figure 2:
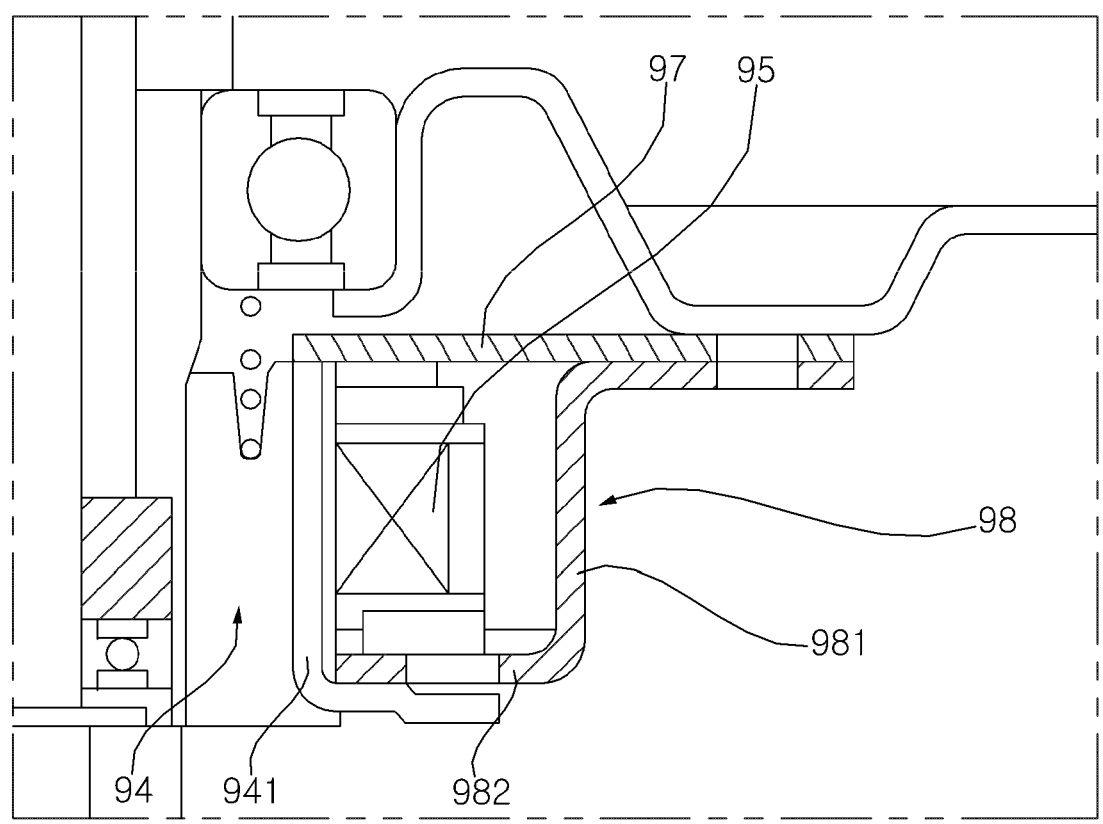
FIG. 2 is an enlarged view of a portion of FIG. 1.
Figure 3:
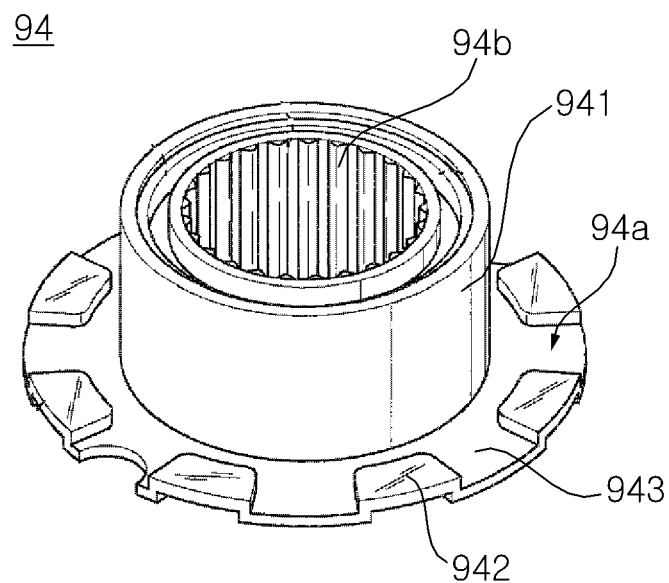
FIG. 3 shows a slider shown in FIG. 1.
Figure 4:
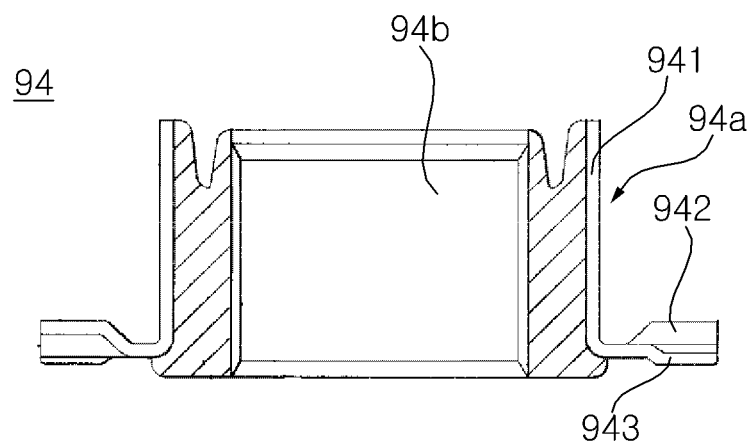
FIG. 4 shows a cross section of the slider shown in FIG. 3.
Figure 5:
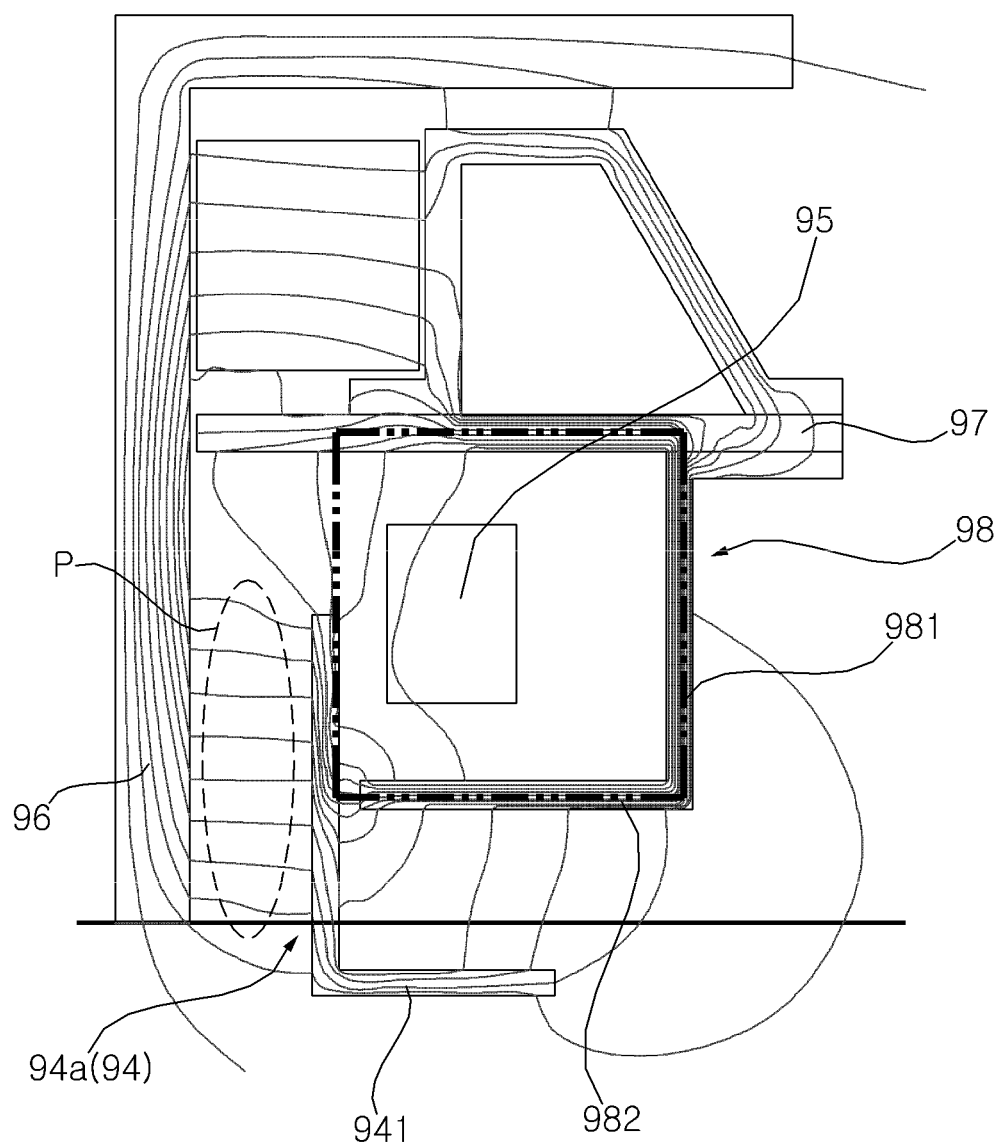
FIG. 5 shows a magnetic field in a portion shown in FIG. 2.
Figure 6:
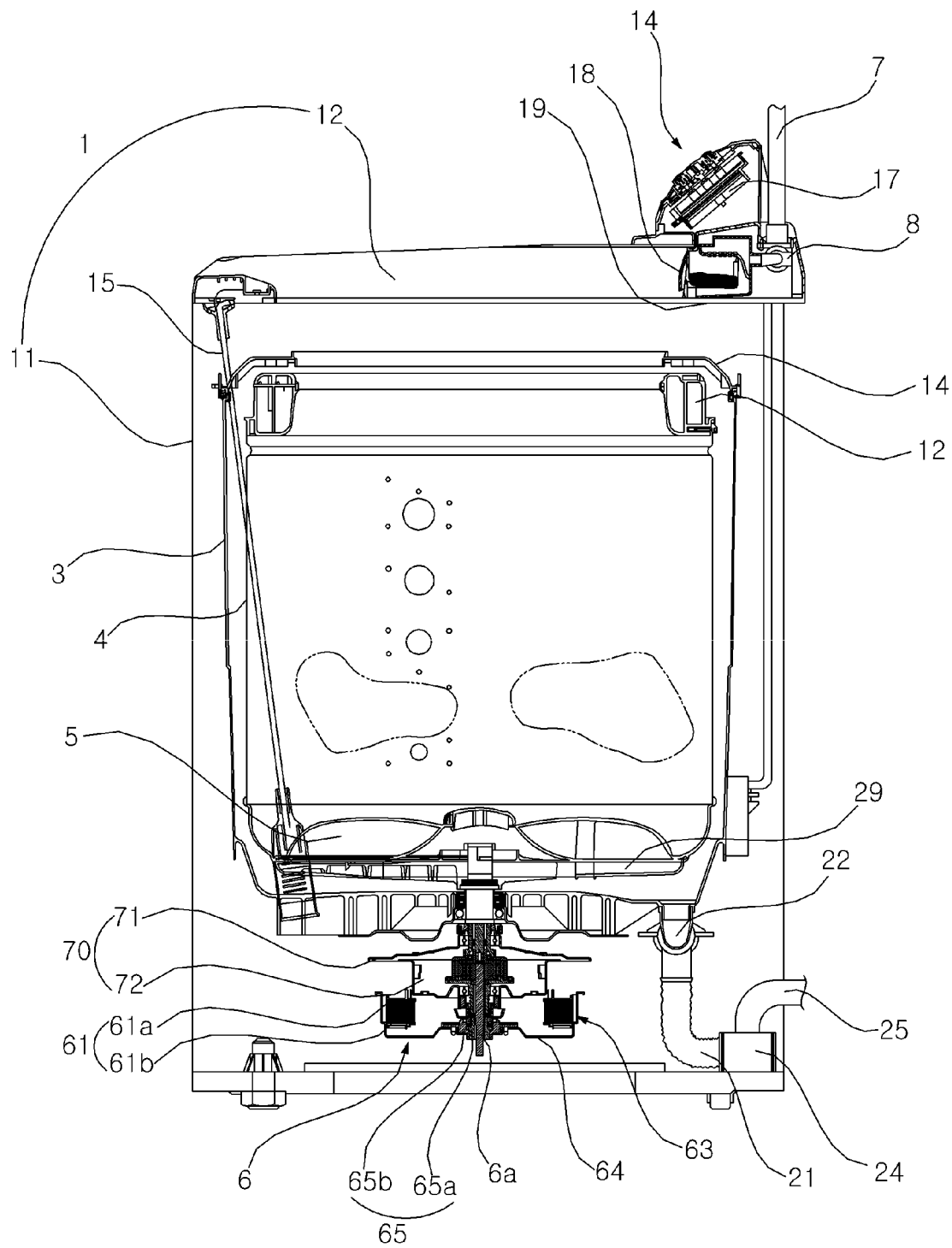
FIG. 6 shows a washing machine according to an embodiment of the present disclosure.
Figure 7:
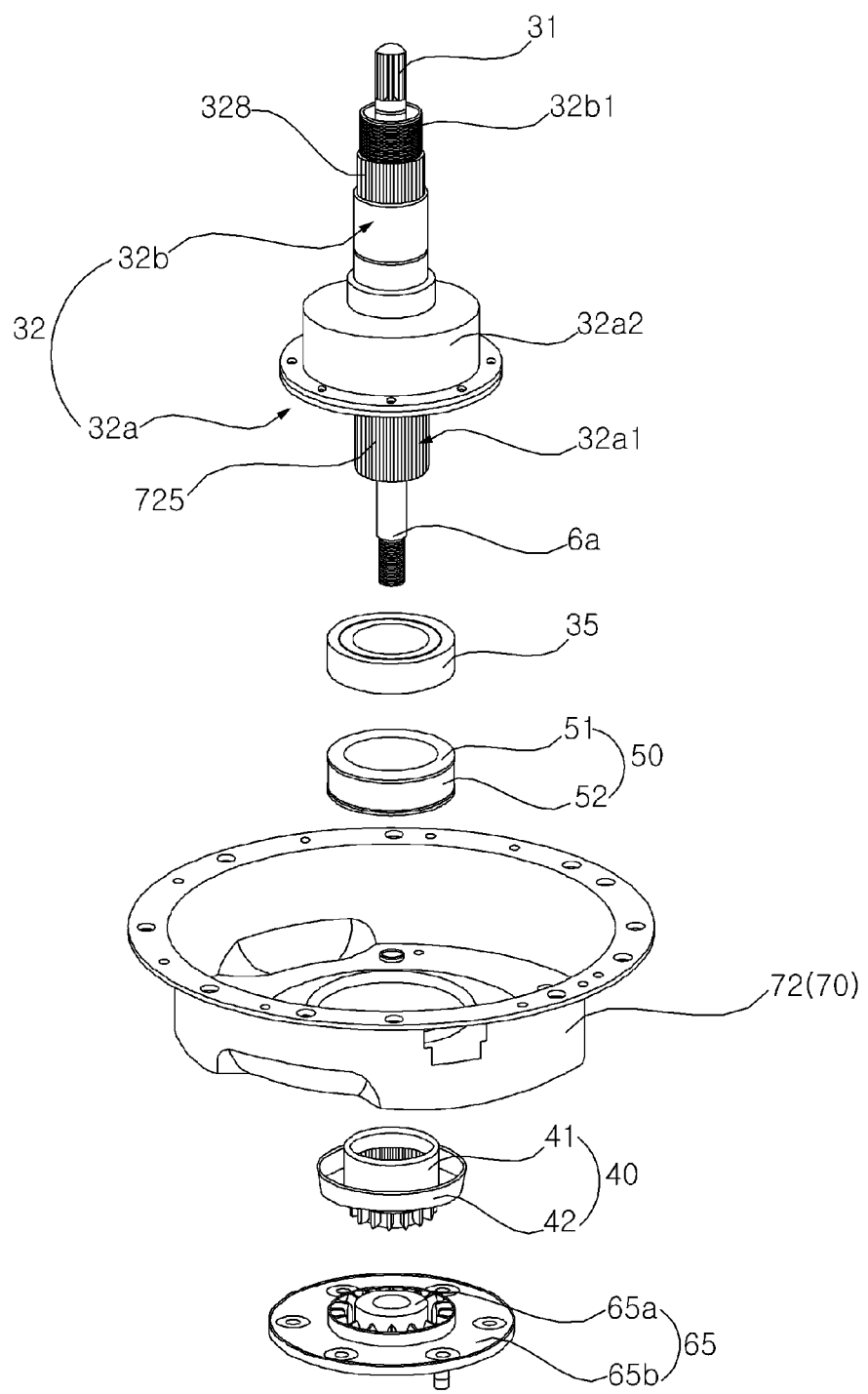
FIG. 7 is a partially exploded perspective view of a portion of the washing machine shown in FIG. 6.
Figure 8:
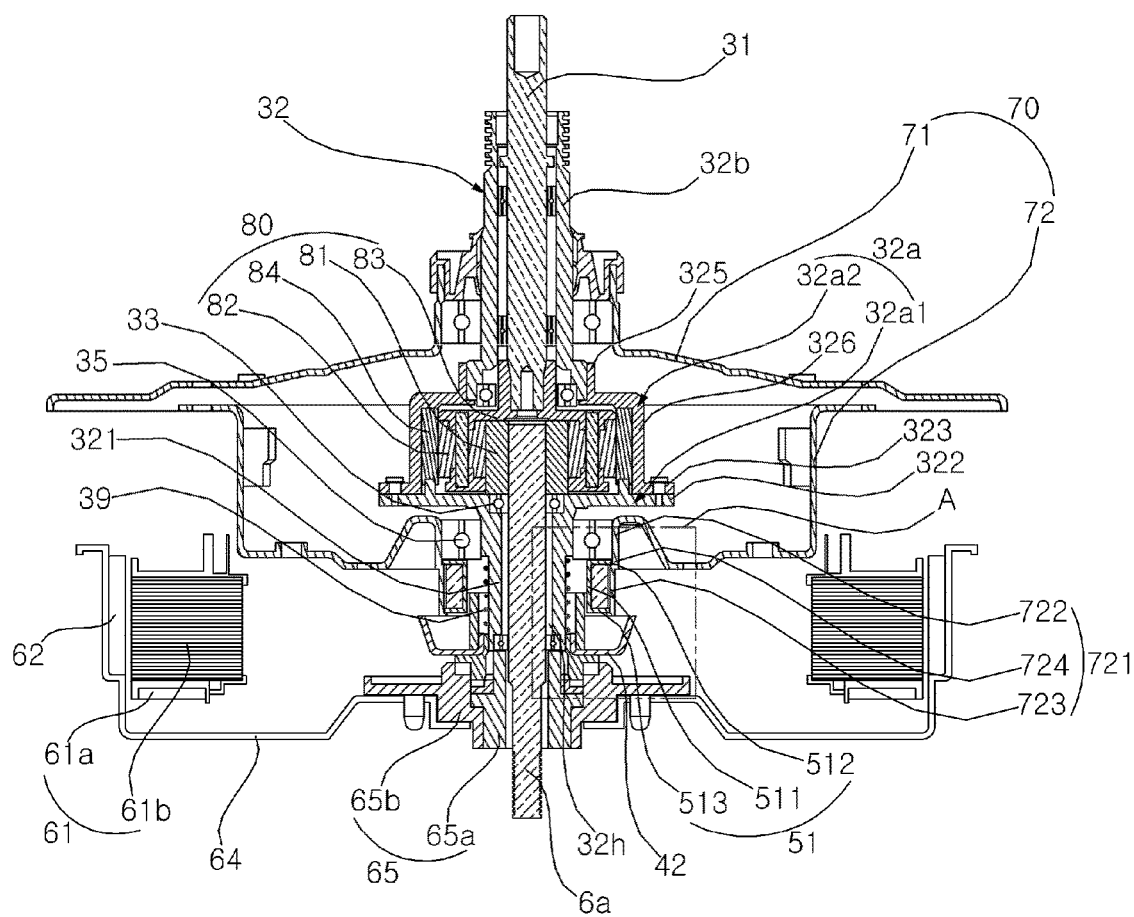
FIG. 8 is an enlarged view of a portion of the washing machine shown in FIG. 6.

Referring to FIGS. 6 to 8, a washing machine according to an embodiment of the present disclosure may include a casing 1 that forms an outer shape, and forms a space in which a water storage tank 3 (or outer tub) is accommodated. The casing 1 may include a cabinet 11 having an opened upper surface, a top cover 12 coupled to the opened upper surface of the cabinet 11, and a load port, through which laundry is introduced, formed in an approximately central portion thereof. The top cover 12 may be rotatably coupled to a door (not shown) for opening and closing the load port.

A suspension 15 which suspends the water storage tank 3 on the casing 1 may be provided. An upper end of the suspension 15 may be connected to the top cover 12, and the lower end of the suspension 15 may be connected to the water storage tank 3. The suspension 15 may be provided in each of four corners in the casing 1.

A control panel 14 may be provided in the top cover 12. The control panel 14 may include an input unit (e.g., a button, a dial, a touch pad, etc.) for receiving various control commands for controlling the operation of the washing machine from a user, and a display unit (e.g., LCD, LED display, etc.) for visually displaying the operating state of the washing machine.

A water supply pipe 7 for guiding water supplied from an external water source such as a faucet, and a water supply valve 8 for controlling the water supply pipe 7, may be provided. The water supply valve 8 may be controlled by a controller 17. The controller 17 may control not only the water supply valve 8 but also overall operation of the washing machine. The controller 17 may include a microprocessor having a memory for storing data. Hereinafter, unless otherwise stated, it will be understood that the control of the electrical/electronic components constituting the washing machine is performed by the controller 17.

A drawer 18 for containing the detergent may be housed in a drawer housing 19 to be movable in and out of the drawer housing 19. The water supplied through the water supply valve 8 is mixed with the detergent while passing through the drawer 18, and then discharged into the water storage tank 3 or a washing tub 4 (or inner tub) located within the water storage tank. A discharge pipe 21 for discharging the water from the water storage tank 3 and a drain valve 22 for controlling the discharge pipe 21 may be provided. The water discharged through the discharge pipe 21 may be pumped by a drain pump 24 and discharged to the outside of the washing machine through a drain pipe 25.

The washing tub 4 accommodates laundry and is rotated about a vertical axis in the water storage tank 3. A pulsator 5 is rotatably provided in the washing tub 4. The pulsator 5 is connected to a pulsator shaft 31.

A drive shaft 6a (or inner shaft) is implemented to rotate the pulsator 5 and is rotated by a washing motor 6. The drive shaft 6a is connected to a rotor 63 of the washing motor 6. A planetary gear train 80 may be provided that receives rotational force of the drive shaft 6a of the washing motor 6 and converts an output at a preset speed ratio or torque ratio to rotate the pulsator shaft 31.

The planetary gear train 80 rotates the pulsator shaft 31 by converting the torque inputted through the drive shaft 6a according to a set gear ratio. The gear ratio may be determined according to the number of teeth of a sun gear 81, a pinion gear 82, and a ring gear 84.

That is, in the embodiment, the drive shaft 6a is not directly connected to the pulsator 5, but is instead connected to the pulsator 5 by the planetary gear train 80 and the pulsator shaft 31. However, the present disclosure is not limited thereto and, in some embodiments, the planetary gear train 80 may not be used, and instead the drive shaft 6a of the washing motor 6 may be directly connected to the pulsator 5.

Referring to FIG. 8, the planetary gear train 80 is disposed in a gear housing 32a constituting the lower end of a dehydration shaft 32 (or outer shaft) described later. The gear housing 32a is coupled with an upper dehydration shaft 32b constituting the upper end portion of the dehydration shaft 32. More specifically, the dehydration shaft 32 is composed of an assembly of the gear housing 32a and the upper dehydration shaft 32b, and a first hollow 32h is formed to penetrate the assembly as a whole. A bearing 35 is configured to support the gear housing 32a.

However, in some embodiments, when the planetary gear train 80 is not provided, the gear housing 32a is also unnecessary. Therefore, in this case, the dehydration shaft 32 is composed of only the upper dehydration shaft 32b, which thus may be supported by the bearing 35.

The gear housing 32a may include a lower gear housing 32a1 and an upper gear housing 32a2. The lower gear housing 32a1 and the upper gear housing 32a2 are coupled to each other by a fastening member such as screw or bolt. The lower gear housing 32a1 is formed in a cylindrical shape as a whole and forms a hollow extending in the vertical direction, and the drive shaft 6a is inserted into the hollow.

The lower gear housing 32a1 may include a hollow shaft 321 that forms the first hollow 32h and a lower flange 322 that extends outward in the radial direction from the upper end of the hollow shaft 321. A bearing 33 for supporting the hollow shaft 321 and the drive shaft 6a to rotate relative to one another is interposed between the hollow shaft 321 and the drive shaft 6a.

The upper gear housing 32a2 is disposed above the lower gear housing 32a1. The upper gear housing 32a2 forms a certain accommodation space above the lower flange 322, and the planetary gear train 80 is disposed in the accommodation space. The accommodation space has a form of generally extending in the vertical direction, and the upper side and the lower side are open respectively.

The upper gear housing 32a2 is provided with a boss 325 coupled with the upper dehydration shaft 32b, and an upper side of the accommodation space is opened by the boss 325. The upper gear housing 32a2 may include a housing body 326 forming an inner circumferential surface surrounding the ring gear 84, and an upper flange 323 extends outwardly along the radial direction from an opened lower side of the housing body 326. The upper flange 323 is engaged with the lower flange 322, and the boss 325 extends upwardly from the housing body 326.

The sun gear 81 is connected to the drive shaft 6a, and rotates integrally with the drive shaft 6a. In the embodiment, the sun gear 81 is a helical gear, and correspondingly, the pinion gear 82 and the ring gear 84 are also configured to have teeth in the form of a helical gear, but are not necessarily limited thereto. For example, the sun gear 81 may be implemented by a spur gear, and the pinion gear 82 and the ring gear 84 may also have teeth in the form of a spur gear.

The ring gear 84 may be fixed in the housing body 326 (or with respect to the housing body 326). That is, the ring gear 84 is rotated integrally with the gear housing 32a. The ring gear 84 is provided with teeth formed on an inner circumferential surface defining a ring-shaped opening.

The pinion gear 82 is interposed between the sun gear 81 and the ring gear 84 to mesh with the sun gear 81 and the ring gear 84. A plurality of pinion gears 82 may be disposed along the circumference of the sun gear 81, and each pinion gear 82 is rotatably supported by a carrier 83. The pinion gear 82 may be formed of acetal resin (POM).

The carrier 83 is engaged with (shaft-joint) the pulsator shaft 31. The carrier 83 is a type of link that connects the pinion gear 82 and the pulsator shaft 31. That is, as the pinion gear 82 revolves around the sun gear 81, the carrier 83 is rotated, so that the pulsator shaft 31 is rotated along with the carrier 83.

The washing motor 6 may be a brushless direct current (BLDC) motor of an outer rotor type. Specifically, the washing motor 6 may include a stator 61 in which a stator coil 61*b* is wound around a stator core 61*a*, and a rotor 63 that is rotated by an electromagnetic force acting between the stator 61 and the rotor 63. The rotor 63 may include a rotor frame 64 that fixes a plurality of permanent magnets 62 spaced along the circumferential direction, and a rotor hub 65 that connects the center of the rotor frame 64 with the drive shaft 6*a*.

However, the type of washing motor 6 is not limited thereto. For example, the washing motor 6 may be an inner rotor type, and may be an AC motor such as an induction motor and a shaded pole motor and, furthermore, may be formed of other well-known various types of motor.

Figure 12:
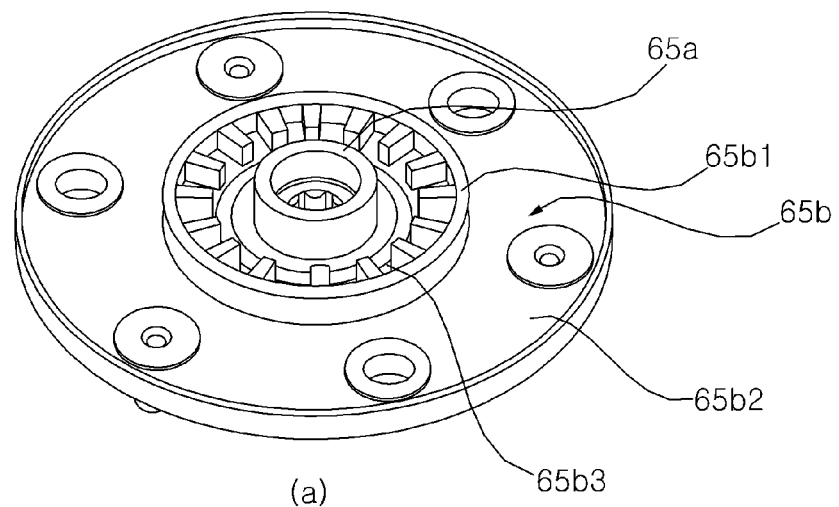
FIG. 12 is a perspective view (a) and a plan view (b) of a rotor hub shown in FIG. 8.
Figure 12:
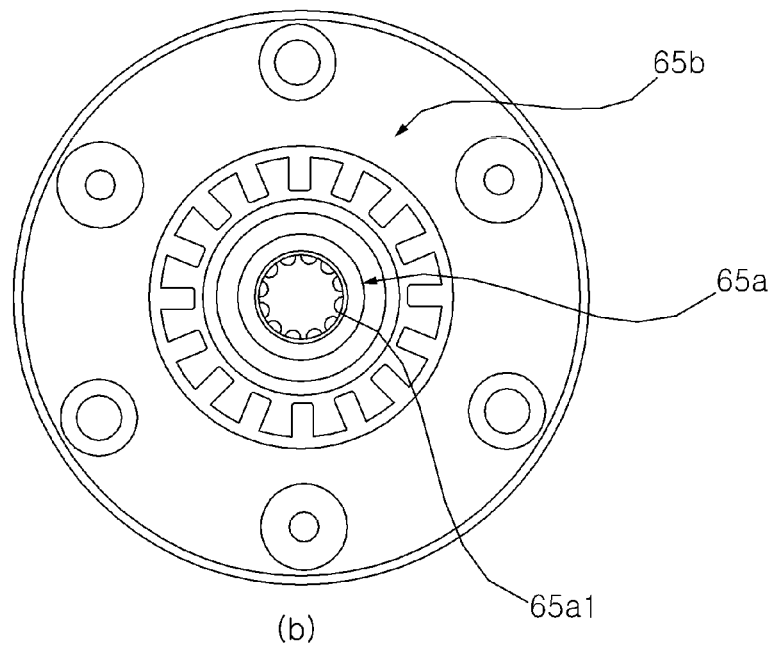

Referring to FIG. 12, the rotor hub 65 may include a rotor bush 65*a* coupled to the drive shaft 6*a*, and a coupling flange 65*b* coupling the rotor bush 65*a* to the center of the rotor frame 64. The coupling flange 65*b* may include a cylindrical flange body portion 65*b*1 into which the rotor bush 65*a* is inserted, and a flange portion 65*b*2 extended outward from the flange body portion 65*b*1 and coupled with the rotor frame 64 by a fastening member such as screw or bolt. In particular, engaging grooves 65*b*3 engaging with a clutch coupler 41 described later may be formed in the inner circumferential surface of the flange body portion 65*b*1.

The rotor bush 65*a* may be formed of a metal material (preferably, stainless steel, but not limited thereto). The rotor bush 65*a* is coupled to the drive shaft 6*a*. Preferably, the inner circumferential surface of the rotor bush 65*a* may be spline-jointed to the outer circumferential surface of the drive shaft 6*a*. In (b) of FIG. 12, 65*a*1 illustrates teeth formed in the inner circumferential surface of the rotor bush 65*a*.

The coupling flange 65*b* is formed of a synthetic resin material, and is interposed between the rotor bush 65*a* and the rotor frame 64 so as to perform insulation so that the magnetic flux is not transmitted from the rotor frame 64 to the rotor bush 65*a*.

The rotor bush 65*a* and the coupling flange 65*b* can be integrally formed, by injecting a synthetic resin to form the coupling flange 65*b* while inserting the rotor bush 65*a* into a mold.

The dehydration shaft 32 is connected to the washing tub 4, and the first hollow 32*h* through which the pulsator shaft 31 passes is formed inside. The dehydration shaft 32 may be formed of a ferromagnetic agent. The dehydration shaft 32 may be connected to the washing tub 4 by a hub base 29 (see FIG. 6). The hub base 29 is coupled to the lower end of the washing tub 4, and a fastener through which the dehydration shaft 32 passes is formed in the center of the hub base 29. The dehydration shaft 32 is spline-jointed to the inner circumferential surface of the fastener, so that the hub base 29 is rotated together when the dehydration shaft 32 is rotated. The upper end 32*b*1 (see FIG. 7) of the dehydration shaft 32, having passed through the hub base 29, may be secured to the hub base 29 by a nut that fastens the dehydration shaft 32 to the hub base 29.

Here, a spline-coupling means that a spline 328 such as a tooth or a key extended axially is formed in one of the dehydration shaft 32 or the hub base 29, and a groove engaged with the spline is formed in the other, so that the spline and the groove are engaged with each other. The hub base 29 is also rotated together with the dehydration shaft 32 when the dehydration shaft 32 is rotated by such an engagement. When the cross section of the tooth constituting the spline is triangular, this may be separately referred to as a serration.

Referring to FIG. 8, the bearing 35 supporting the dehydration shaft 32 is provided in a bearing housing 70. At least a part of the bearing 35 may be formed of ferromagnetic material. The bearing 35 may be a rolling bearing. In this case, the bearing 35 may include an inner ring 35*a* coupled with the dehydration shaft, an outer ring 35*b* which is a non-rotating fixture coupled with the bearing housing 70, and a rolling element 35*c* (e.g., a ball or roller) which is held by a retainer (not shown) between the inner ring 35*a* and the outer ring 35*b* to support the inner ring 35*a* to be rotated with respect to the outer ring 35*b*. At least one of the inner ring 35*a*, the outer ring 35*b*, the rolling element 35*c*, and the retainer may be formed of a ferromagnetic material.

The bearing housing 70 may be coupled to the bottom surface of the water storage tank 3. The bearing housing 70 may be formed of ferromagnetic material. The bearing housing 70 may include an upper bearing housing 71 coupled to the bottom surface of the water storage tank 3, and a lower bearing housing 72 that is coupled to the upper bearing housing 71 in the lower side of the upper bearing housing 71, and defines a space in which the bearing 35 is accommodated between the upper bearing housing 71 and the lower bearing housing 72.

Figure 13:
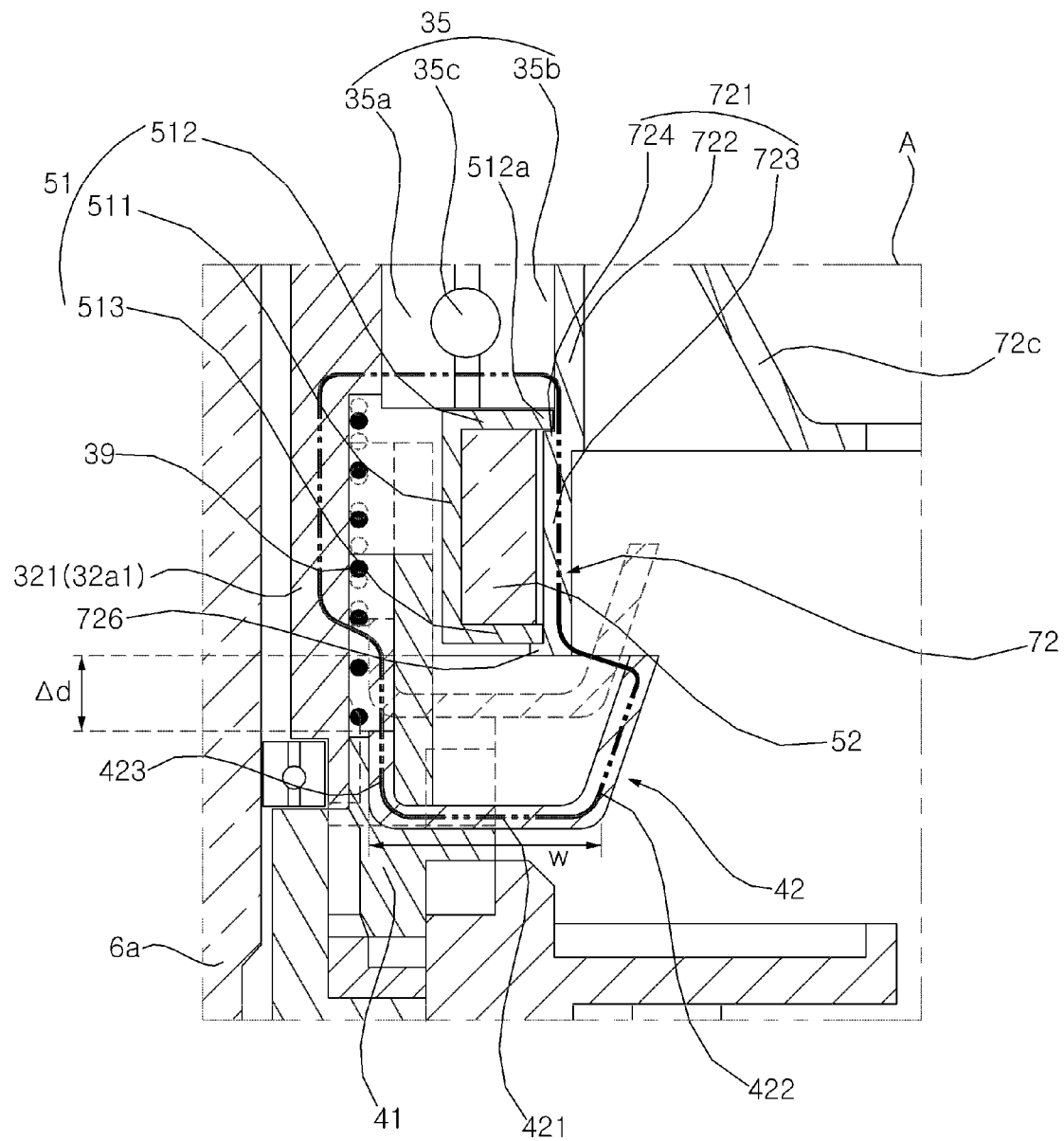
FIG. 13 is an enlarged view of a portion indicated by A in FIG. 8.

Referring to FIGS. 8 and 13, a solenoid 50 is provided that forms a magnetic field when a current is applied. The solenoid 50 may be disposed in the bearing housing 70. The solenoid 50 has a coil 52 wound about the dehydration shaft 32. Specifically, the solenoid 50 may include a bobbin 51 and a coil 52 wound around the bobbin 51. The bobbin 51 is provided with a hollow through which the dehydration shaft 32 passes, and the coil 52 is wound around the outer circumference of the bobbin 51.

The coil 52 may be wrapped with a resin of a flame retardant material. The bobbin 51 may include a cylindrical bobbin body portion 511 around which the coil 52 is wound, an upper plate portion 512 extended outward from an upper end of the bobbin body portion 511, and a lower plate portion 513 extended outward from a lower end of the bobbin body portion 511. The lower plate portion 513 of the bobbin 51 may be supported by a portion 726 (see FIG. 13) protruding radially inward from the lower end of a second fixing core 723.

A fixing core (magnetic core) 721 surrounding the solenoid 50 is provided. The fixing core 721 forms a magnetic path through which the magnetic field generated by the solenoid 50 passes. The fixing core 721 may be formed by part of the bearing housing 70.

The bearing housing 70 may include a cylindrical first fixing core 722 surrounding an outer circumference of the bearing 35, and a cylindrical second fixing core 723 that is extended downward from the first fixing core 722 and surrounds the outer circumference of the solenoid 50.

In detail, the lower bearing housing 72 includes a cylindrical (or tubular) portion forming the fixing core 721 that wraps around the dehydration shaft 32 and is extended in the vertical direction, and such a cylindrical portion forming the fixing core 721 includes the first fixing core 722 and the second fixing core 723 that form the magnetic path.

However, the present disclosure is not limited thereto, and it is also possible to configure the fixing core as a separate component from the bearing housing 70.

Figure 10:
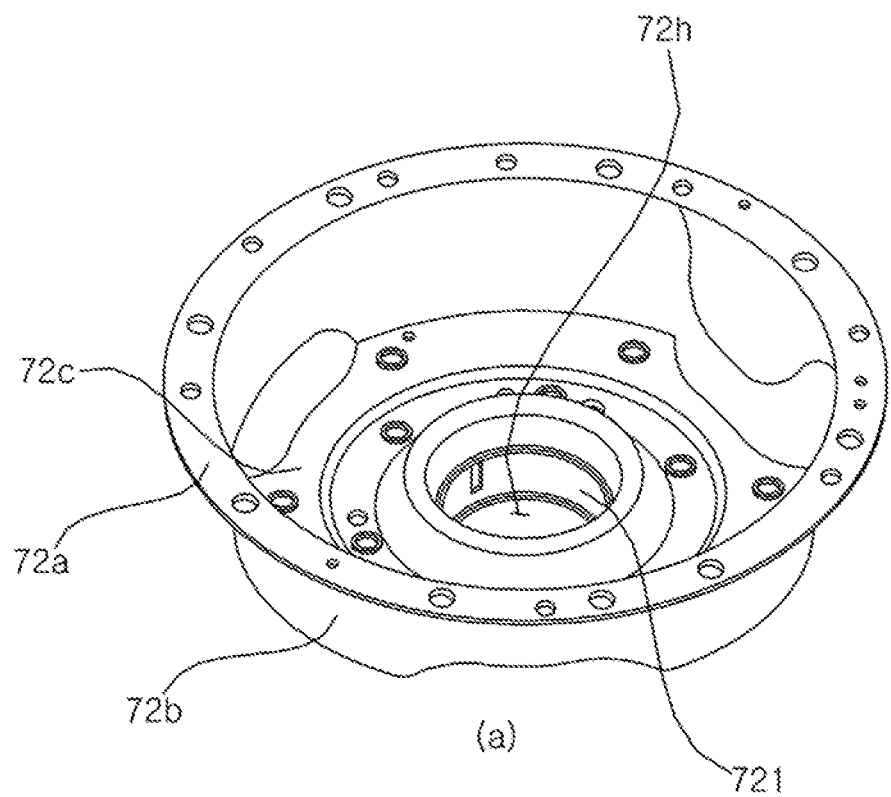
FIG. 10 is a perspective view (a) and a side view (b) of a lower bearing housing shown in FIG. 8.
Figure 10:
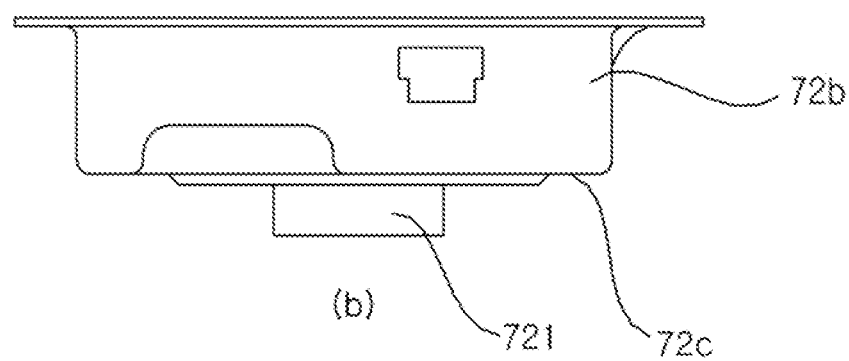

Referring to FIG. 10, the lower bearing housing 72 may include a ring-shaped coupling flange portion 72*a* coupled to the upper bearing housing 71 by a fastening member such as a screw or bolt, and a cylindrical housing side portion 72*b* extended downward from the inner diameter portion of the coupling flange portion 72*a*.

The lower bearing housing 72 may further include a housing lower plate portion 72*c* extended radially inward from a lower end of the housing side portion 72*b*. The dehydration shaft 32 passes through the housing lower plate portion 72*c*. The first fixing core 722 may extend downwardly from the housing lower plate portion 72*c*. Preferably, the first fixing core 722 extends downwardly from around an opening through which the dehydration shaft 32 passes.

An opening 72*h*, through which the dehydration shaft 32 passes, may be formed in the lower bearing housing 72 below the second fixing core 723. The opening 72*h* is defined by the portion 726 protruding radially inward from the lower end of the lower end of a second fixing core 723. In this case, the opening 72*h* may have a larger diameter than the hollow (hollow through which the dehydration shaft 32 passes) formed in the bobbin 51.

Meanwhile, the second fixing core 723 may have a smaller inner diameter than the first fixing core 722. In addition, the upper plate portion 512 of the bobbin 51 is protruded outward in the radial direction more than the coil 52, so that such a protruding portion 512*a* may be supported by a horizontal portion located between the first fixing core 722 and the second fixing core 723. More specifically, on the inner side surface of the cylindrical portion of the bearing housing forming the fixing core 721, a surface 724 extends substantially horizontally from the lower end of the first fixing core 722 to the upper end of the second fixing core 723 due to an inner diameter difference between the first fixing core 722 and the second fixing core 723.

The clutch 40 which performs a shaft-joint (or connection) or a shaft-joint release (or disconnection) between the drive shaft 6*a* and the dehydration shaft 32 is provided. The clutch 40 is provided to be lifted along the dehydration shaft 32 from the lower side of the solenoid 50. The clutch 40 performs a shaft-joint between the drive shaft 6*a* and the dehydration shaft 32 at a connection position, and performs a shaft-joint release between the drive shaft 6*a* and the dehydration shaft 32 at a disconnection position by being lifted from the connection position by the magnetic force of the solenoid 50.

The clutch 40 is disposed below the solenoid 50 as a whole, but the armature 42 (or plunger), or a movable core forming a magnetic path of the flux formed by the solenoid 50, may partially reach the inside of the solenoid 50. The armature 42 may be formed of ferromagnetic material.

Figure 11:
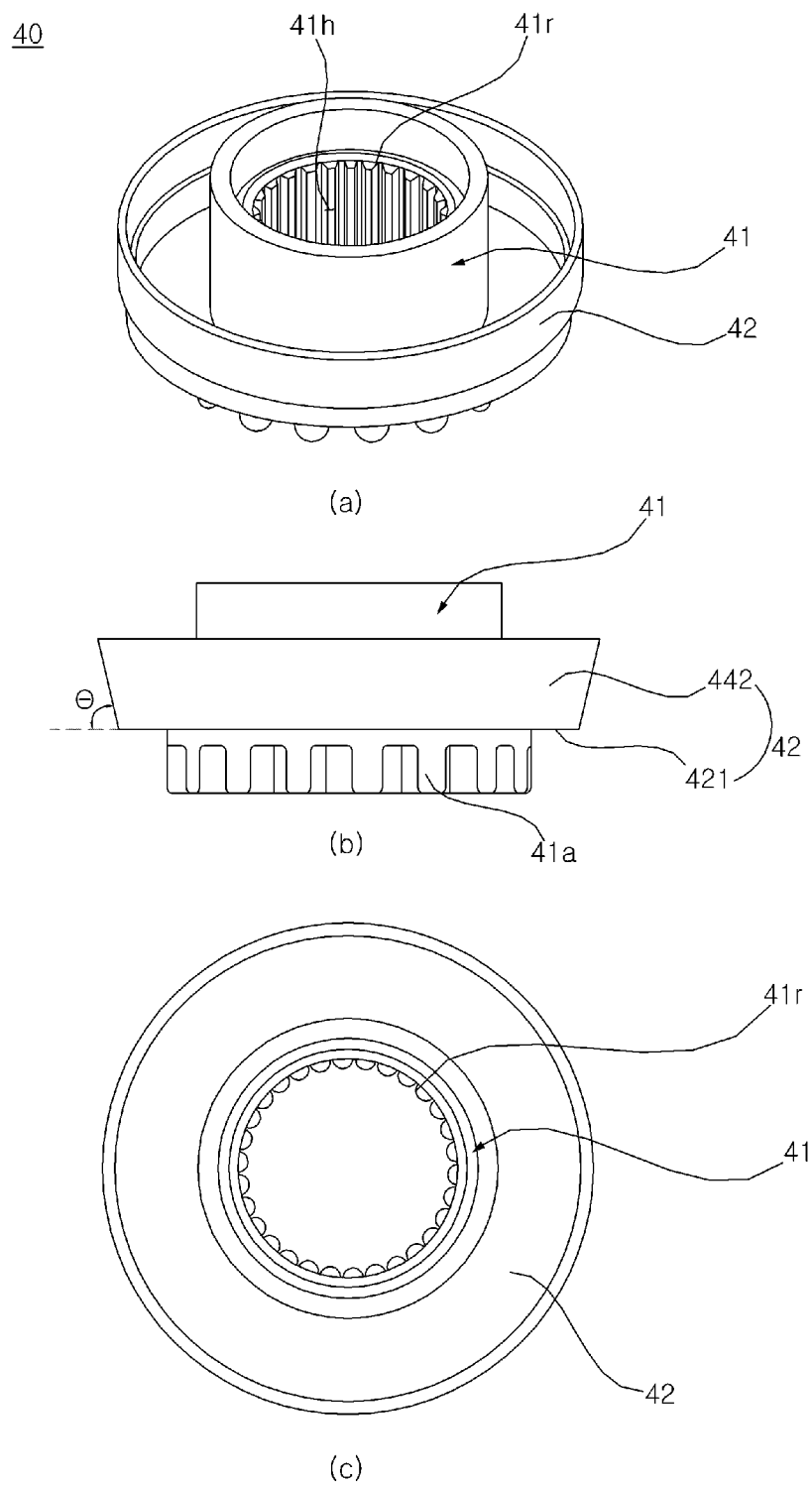
FIG. 11 is a perspective view (a), a side view (b), and a plan view (c) of a clutch shown in FIG. 8.

Referring to FIG. 11, the clutch 40 further includes a clutch coupler 41 that is moved by the armature 42. The clutch coupler 41 is formed in a cylindrical shape as a whole to form a second hollow 41*h* into which the dehydration shaft 32 is inserted. The clutch coupler 41 may be formed of a synthetic resin material, but is not necessarily limited thereto, and may be formed of a metal (e.g., ferromagnetic material).

Since the inner circumferential surface defining the second hollow 41*h* is spline-jointed to the outer circumferential surface of the dehydration shaft 32, the clutch coupler 41 may move in the axial direction (i.e., the longitudinal direction of the dehydration shaft 32) in the state where the clutch rotation with respect to the dehydration shaft 32 is restrained. The inner circumferential surface may be provided with an engaging groove 41*r* that meshes (or engages) with teeth 725 (see FIG. 7) formed in the outer circumferential surface of the dehydration shaft 32.

Figure 9:
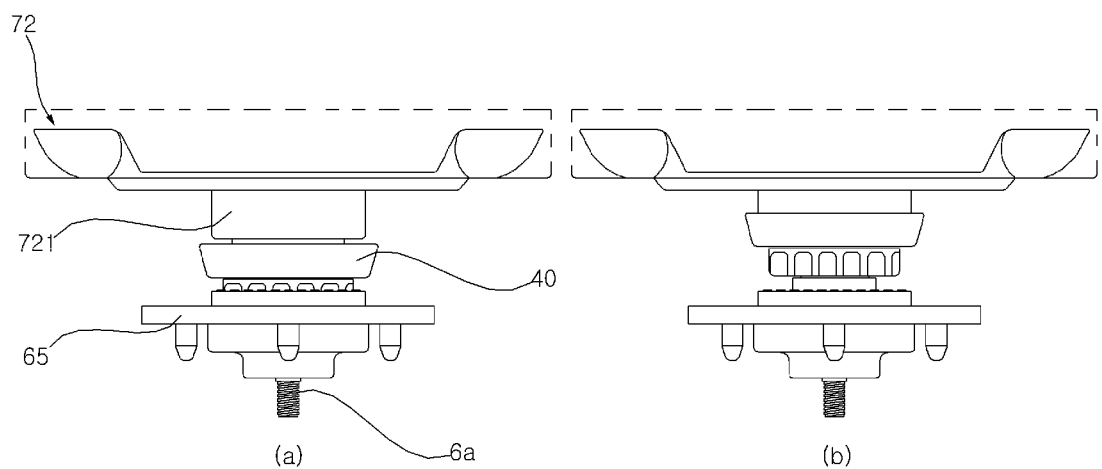
FIG. 9 shows a state (a) in which a clutch is in a connected position, and shows a state (b) in which the clutch is in a disconnected position.

The clutch coupler 41 performs a shaft-joint (connection) between the drive shaft 6*a* and the dehydration shaft 32 at a first position corresponding to the connection position (see FIG. 9A), and performs a shaft-joint release (disconnection) between the drive shaft 6*a* and the dehydration shaft 32 at a second position corresponding to the disconnection position (see FIG. 9B).

Referring to FIGS. 11 and 12, teeth 41*a* may be formed at the lower end of the clutch coupler 41, so that when the clutch coupler 41 is located in the first position, the teeth 41*a* engage with the engaging groove 65*b*3 of the coupling flange 65*b*.

Lifting of the clutch coupler 41 along the dehydration shaft 32 is performed by the armature 42. That is, the lifting of the clutch coupler 41 is achieved by the lifting force applied to the armature 42 which is lifted by the electromagnetic interaction with the solenoid 50.

The clutch coupler 41 may be coupled to the armature 42, and may be integrally lifted with the armature 42. The clutch coupler 41 may be formed by injecting the synthetic resin in the state where the armature 42 is inserted into the mold, so that the clutch coupler 41 and the armature 42 can be integrally formed.

Referring to FIG. 13, an elastic member 39 may be provided for pushing the clutch 40 downward. In this case, in order for the clutch 40 to be lifted when a current is applied to the solenoid 50, the lifting force acting on the clutch 40 due to the magnetic field must be greater than a descending force applied by the elastic member 39 to the clutch 40.

The elastic member 39 may be a coil spring. The elastic member 39 may be disposed inside the bobbin 51, and may be interposed between the bearing 35 and the clutch coupler 41. The upper end of the elastic member 39 may contact the bearing 35 or an area adjacent to the bearing 35, and the lower end may contact the clutch coupler 41.

The armature 42 may include a core base 421 disposed below the fixing core 721 and extended outward from the clutch coupler 41, and a core outer portion 422 extended upward from the outer circumference of the core base 421.

At least a part of the core outer portion 422 may be located further away from the dehydration shaft 32 than the cylindrical portion forming the fixing core 721. Preferably, the upper end of the core outer portion 422 is located further from the dehydration shaft 32 than the cylindrical portion forming the fixing core 721.

The core outer portion 422 may have a cylindrical shape extended along the outer circumference of the core base 421. The core outer portion 422 may have a cylindrical shape having an upper end that has the same diameter as the outer circumference of the core base 421. However, preferably, as in the embodiment, the core outer portion 422 may have a truncated cone shape having an upper end diameter larger than a lower end diameter. For reference, the angle θ shown in FIG. 11 is an angle between the core outer portion 422 and the horizontal, preferably 90 degrees or less, but is not necessarily limited thereto.

In a state where the armature 42 is lowered to the connection position of the clutch 40, the upper end of the core outer portion 422 is spaced apart from the lower end of the second fixing core 723.

In a state where the armature 42 is lifted to the disconnection position of the clutch 40, the upper end of the core outer portion 422 may be located above the lower end of the second fixing core 723.

An opening through which the dehydration shaft 32 passes may be formed in the core base 421, and a core inner portion 423 may be extended upward from a circumference of the opening. The core inner portion 423 may be inserted (or embedded) in the mold.

The core inner portion 423 extends upward from the core base 421. The core inner portion 423 may extend from the core base 421 to a position lower than the core outer portion 422. In this case, since the core inner portion 423 is further away from the lower end of the fixing core 721 or the bearing 35 as much as the height difference Δd with the core outer portion 422, in the state where the armature 42 is lowered, the magnetic flux leaking from the core inner portion 423 to the fixing core 721 or the bearing 35 can be reduced.

When a current is applied to the solenoid 50, the magnetic flux in the lower end of the fixing core 721 forms a magnetic path mainly between the upper end of the core outer portion 422 and the lower end of the fixing core 721. In addition, the core inner portion 423 is spaced apart from the core outer portion 422 in the horizontal direction by a distance corresponding to the width w of the core base 421, so that it is relatively close to the dehydration shaft 32 in comparison with the core outer portion 422. Therefore, the magnetic flux in the core inner portion 423 forms a magnetic path mainly between the dehydration shaft 32 and the core inner portion 423.

In particular, since the core inner portion 423 extends substantially in parallel with the dehydration shaft 32 to form a cylindrical shape that surrounds the outer side of the dehydration shaft 32, the planes of the core inner portion 423 and the dehydration shaft 32 face to each other. Therefore, the magnetic flux flows smoothly from the core inner portion 423 to the dehydration shaft 32.

In particular, as shown in FIGS. 8 and 13, since a closed magnetic path (portion indicated by a two-point chain line in FIG. 13) is formed extending into the bearing 35, the fixing core 721, the armature 42, and the dehydration shaft 32, there is almost no magnetic flux leakage. Thus, substantially all of the magnetic flux flowing along the magnetic path contributes to the lifting of the armature 42.

In other words, since the core outer portion 422 of the armature 42 is adjacent to the fixing core 721, and the core inner portion 423 of the armature 42 is adjacent to the dehydration shaft 32, the magnetic flux flowing from the solenoid 50 to the bearing housing 70 passes out of the fixing core 721 and passes through air, and then is absorbed by the core outer portion 422 of the armature 42.

Meanwhile, the magnetic flux absorbed by the outer portion of the armature 42 flows again along the core base 421 to the core inner portion 423, and is absorbed by the dehydration shaft 32 after passing through the clutch coupler 41 from the core inner portion 423. Then, the magnetic flux flowing along the dehydration shaft 32 passes through the bearing 35 and is absorbed into the first fixing core 722.

As described above, in the washing machine according to the embodiment of the present disclosure, a magnetic path connecting the bearing 35, the bearing housing 70, the armature 42, and the dehydration shaft 32 is configured. In particular, in the magnetic path, there exists an air layer between the cylindrical portion forming the fixing core 721 of the bearing housing 70 and the core outer portion 422 of the armature 42, and the core inner portion 423 of the armature 42, and there exists a clutch coupler 41 of a non-ferromagnetic material (e.g., an injection of synthetic resin) between the core inner portion 423 of the armature 42 and the dehydration shaft 32. However, the magnetic path has a closed curve shape as a whole. Since the magnetic flux generated from the solenoid 50 flows along the closed curve-shaped magnetic path, leakage of the magnetic flux can be reduced in comparison with the related art, so that the lifting force of the clutch coupler 41 can be increased.

As described above, the washing machine according to the present disclosure has several effects.

The washing machine of the present disclosure forms a fixing core magnetized by a solenoid in a bearing housing in which a bearing is accommodated for supporting the dehydration shaft, so that a separate part for the fixing core is not necessary, thereby simplifying the structure of the product, and reducing the number of parts.

The magnetic flux which contributes to the lifting of the clutch can be used more efficiently than in the related art.

The bearing housing for accommodating the bearing supporting the dehydration shaft constitutes a magnetic path through which the magnetic flux generated from the solenoid passes, so that the conventional fixing core for constituting the magnetic path is not required, and the configuration of the product is simplified and the manufacturing cost is reduced.

A separate part that is used to install the conventional solenoid can be eliminated by disposing the solenoid in the bearing housing.

The lifting operation of the armature can be accomplished smoothly, by utilizing the conventional magnetic flux flowing from the armature to the dehydration shaft to lift the armature.

When attempting to apply the lifting force to the armature at a conventional level, the power supplied to the solenoid can be reduced in comparison with the related art.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

What is claimed is:

1. A washing machine, comprising:
   a washing tub provided to accommodate laundry therein;
   a dehydration shaft configured to rotate the washing tub, the dehydration shaft having a hollow portion therein;
   a pulsator rotatably disposed in the washing tub;
   a drive shaft passing through the hollow portion of the dehydration shaft, the drive shaft configured to rotate the pulsator;
   a solenoid configured to generate a magnetic field when a current is applied to the solenoid;
   a clutch lifted along the dehydration shaft from a lower side of the solenoid when the current is applied to the solenoid, the clutch being configured to selectively transmit rotation of the drive shaft to the dehydration shaft;
   a bearing configured to rotatably support the dehydration shaft, the bearing being located at an upper side of the solenoid; and
   a bearing housing configured to receive the bearing and the solenoid therein, the bearing housing comprising:
   a first fixing core surrounding an outer periphery of the bearing and contacting the outer circumference of the bearing; and
   a second fixing core extended downward from the first fixing core, the second fixing core surrounding an outer periphery of the solenoid to fix an arrangement of the solenoid, wherein the first fixing core and the second fixing core are integrally formed.

2. The washing machine of claim 1, wherein the second fixing core has an inner diameter smaller than an inner diameter of the first fixing core.

3. The washing machine of claim 2, wherein the solenoid is supported by an upper end portion of the second fixing core.

4. The washing machine of claim 3, wherein the solenoid comprises a bobbin and a coil wound around the bobbin, wherein the bobbin comprises:
   a bobbin body portion providing an aperture through which the dehydration shaft passes, the bobbin body portion including an outer circumferential surface around which the coil is wound; and
   an upper plate portion extended radially outward from an upper end of the bobbin body portion, and
   wherein the upper end portion of the second fixing core supports the upper plate portion.

5. The washing machine of claim 1, further comprising a water storage tub to contain water therein,
   wherein the washing tub is located in the water storage tub,
   wherein the bearing housing comprises:
   an upper bearing housing coupled to a bottom surface of the water storage tub; and
   a lower bearing housing located below the upper bearing housing, the upper bearing housing and the lower bearing housing defining a space to accommodate the bearing therein,
   wherein the lower bearing housing comprises:
   a ring-shaped coupling flange portion coupled to the upper bearing housing; and
   a housing side portion extended downward from an inner diameter portion of the coupling flange portion,
   wherein the lower bearing housing comprises the first fixing core and the second fixing core, and
   wherein the second fixing core defines an opening through which the dehydration shaft passes.

6. The washing machine of claim 5, wherein the solenoid comprises a bobbin and a coil wound around the bobbin, the bobbin providing an aperture through which the dehydration shaft passes, and
   wherein the opening of the second fixing core has a diameter larger than a diameter of the aperture of the bobbin.

7. The washing machine of claim 6, wherein the lower bearing housing comprises:
   a housing lower plate portion extended radially inward from a lower end of the housing side portion, and through which the dehydration shaft passes;
   wherein the first fixing core extends downward from the housing lower plate portion.

8. The washing machine of claim 1, wherein the clutch comprises:
   a clutch coupler movable along the dehydration shaft between a first position and a second position, the dehydration shaft being connected to the drive shaft when the clutch coupler is in the first position, and the dehydration shaft being disconnected from the drive shaft when the clutch coupler is in the second position; and
   an armature fixed to the clutch coupler, the armature being movable by the solenoid to thereby move the clutch coupler from the first position to the second position.

9. The washing machine of claim 8, wherein the armature comprises:
   a core base located below the second fixing core, the core base extending outward from the clutch coupler; and
   a core outer portion extending upward from an outer periphery of the core base.

10. The washing machine of claim 9, wherein an uppermost end of the core outer portion is spaced apart from a lowermost end of the second fixing core when the clutch coupler is in the first position.

11. The washing machine of claim 9, wherein a distance between the dehydration shaft and an uppermost end of the core outer portion is larger than a distance between the dehydration shaft and a lowermost end of the second fixing core.

12. The washing machine of claim 9, wherein an uppermost end of the core outer portion is located higher than a lower end of the second fixing core when the clutch coupler is in the second position.

13. The washing machine of claim 9, wherein the core base includes an opening through which the dehydration shaft passes,
   wherein the armature further comprises a core inner portion extended upward from the core base at the opening,
   wherein the clutch coupler is secured to the core inner portion, and
   wherein the clutch coupler comprises a synthetic resin material.

14. The washing machine of claim 8, further comprising:
   a motor having a rotor; and
   a rotor hub connecting the rotor to the drive shaft,
   wherein the clutch coupler is engaged with the rotor hub in the first position and separated from the rotor hub in the second position.

15. The washing machine of claim 1, further comprising an elastic member configured to apply a biasing force to the clutch in a direction biasing the clutch coupler toward the first position.

16. The washing machine of claim 15, wherein the solenoid comprises:
   a bobbin through which the dehydration shaft passes; and
   a coil wound around the bobbin, and
   wherein the elastic member is a coil spring disposed between the bearing and the clutch.

17. A washing machine, comprising:
   a washing tub provided to accommodate laundry therein;
   a dehydration shaft configured to rotate the washing tub, the dehydration shaft having a hollow portion therein;
   a pulsator rotatably disposed in the washing tub;
   a drive shaft passing through the hollow portion of the dehydration shaft, the drive shaft configured to rotate the pulsator;
   a solenoid configured to generate a magnetic field when a current is applied to the solenoid;
   a clutch lifted along the dehydration shaft from a lower side of the solenoid when the current is applied to the solenoid, the clutch being configured to selectively transmit rotation of the drive shaft to the dehydration shaft, the clutch being movable along the dehydration shaft between a first position and a second position, the dehydration shaft being connected to the drive shaft when the clutch is in the first position, and the dehydration shaft being disconnected from the drive shaft when the clutch is in the second position;
   a bearing configured to rotatably support the dehydration shaft, the bearing being located at an upper side of the solenoid; and a bearing housing configured to receive the bearing and the solenoid therein, the bearing housing comprising a ferromagnetic material, the bearing housing including a cylindrical portion surrounding an outer circumference of the bearing and an outer circumference of the solenoid, wherein the solenoid is located in an area defined by the cylindrical portion, and wherein an inner diameter of a second section of the cylindrical portion surrounding the outer circumference of the solenoid is smaller than an inner diameter of a first section of the cylindrical portion surrounding the outer circumference of the bearing.

18. The washing machine of claim 17, further comprising a water storage tub to contain water therein, wherein the washing tub is located in the water storage tub, and wherein the bearing housing comprises:
an upper bearing housing coupled to a bottom surface of the water storage tub; and
a lower bearing housing located below the upper bearing housing, the upper bearing housing and the lower bearing housing defining a space to accommodate the bearing therein, the cylindrical portion being formed in the lower bearing housing.

19. The washing machine of claim 18, wherein the lower bearing housing comprises:
a ring-shaped coupling flange portion coupled to the upper bearing housing;
a cylindrical housing side portion extended downward from an inner diameter portion of the coupling flange portion; and
a housing lower plate portion extended radially inward from a lower end of the housing side portion, and through which the dehydration shaft passes.

20. A washing machine, comprising:
a cabinet;
an outer tub located in the cabinet, the outer tub being provided to accommodate wash water therein;
an inner tub located in the outer tub, the inner tub being provided to accommodate laundry therein;
an outer shaft configured to rotate the inner tub, the outer shaft having a hollow portion therein;
a pulsator rotatably disposed in the inner tub;
an inner shaft passing through the hollow portion of the outer shaft, the inner shaft configured to rotate the pulsator;
a clutch lifted along the dehydration shaft from the lower side of the solenoid when a current is applied to the solenoid, the clutch being configured to selectively transmit rotation of the inner shaft to the outer shaft;
a solenoid configured to generate a magnetic field when the current is applied to the solenoid;
a bearing configured to rotatably support the outer shaft, the bearing being located at an upper side of the solenoid; and
a bearing housing configured to receive the bearing and the solenoid therein, the bearing housing comprising a ferromagnetic material, the bearing housing including a cylindrical portion, the cylindrical portion including:
a first fixing core surrounding an outer periphery of the bearing and contacting the outer circumference of the bearing; and
a second fixing core extended downward from the first fixing core, the second fixing core surrounding an outer periphery of the solenoid to fix an arrangement of the solenoid, and wherein the clutch comprises:
a clutch coupler movable along the outer shaft between a first position and a second position, the outer shaft being connected to the inner shaft when the clutch coupler is in the first position, and the outer shaft being disconnected from the inner shaft when the clutch coupler is in the second position, and
an armature fixed to the clutch coupler, the armature being movable by the solenoid to thereby move the clutch coupler from the first position to the second position, the armature comprising:
a core base located below the second fixing core, the core base extending outward from the clutch coupler; and
a core outer portion extending upward from an outer periphery of the core base,
wherein an uppermost end of the core outer portion moves alongside an outer periphery of the first fixing core as the clutch coupler moves from the first position to the second position.

* * * * *